United States Patent [19]

Müller et al.

[11] 4,213,861
[45] Jul. 22, 1980

[54] PRESSURE FILTER AND PROCESS FOR CLEANING IT

[75] Inventors: Hans Müller, Erlenbach; Konstantin Sotirianos, Stäfa, both of Switzerland

[73] Assignee: Chemap AG, Männedorf, Switzerland

[21] Appl. No.: 904,560

[22] Filed: May 10, 1978

Related U.S. Application Data

[62] Division of Ser. No. 832,979, Sep. 13, 1977, Pat. No. 4,163,724.

[30] Foreign Application Priority Data

| Sep. 16, 1976 | [CH] | Switzerland | 11854/76 |
| Nov. 23, 1976 | [CH] | Switzerland | 14743/76 |
| Dec. 18, 1976 | [CH] | Switzerland | 16050/76 |
| Dec. 24, 1976 | [CH] | Switzerland | 16362/76 |
| Jan. 12, 1977 | [CH] | Switzerland | 445/77 |
| Feb. 9, 1977 | [CH] | Switzerland | 1759/77 |

[51] Int. Cl.² ............................................. B01D 29/38
[52] U.S. Cl. ................................... 210/82; 210/333 R
[58] Field of Search ......................... 210/82, 333 R, 411, 210/81, 332, 409

[56] References Cited

U.S. PATENT DOCUMENTS

| 813,779 | 2/1906 | Cowern | 210/332 |
| 3,240,338 | 3/1966 | Schmidt, Jr. et al. | 210/334 X |
| 3,356,215 | 12/1967 | Miles, Jr. | 210/82 |
| 3,532,220 | 10/1970 | Lewis | 210/409 X |
| 3,637,079 | 1/1972 | Strub | 210/82 |
| 3,653,513 | 4/1972 | Ortega et al. | 210/333 R |
| 3,744,633 | 7/1973 | Schmidt, Jr. et al. | 210/82 |

FOREIGN PATENT DOCUMENTS

1264167  5/1961  France ................................ 210/332

*Primary Examiner*—William A. Cuchlinski, Jr.
*Attorney, Agent, or Firm*—Michael J. Striker

[57] ABSTRACT

In a pressure filter for liquid media a plurality of filter elements is supported by a removable hollow cross bar which, when the filter tank is opened, can be removed together with all or groups of the filter elements. The filter element has a flexible filter wall and preferably an outer fine meshed wall and an inner coarse meshed wall.

Between the two wall portions a packing material is arranged. Preferably the entire filter element is a flexible tube element. Spray tubes are arranged in the filter tank which are also removable together with their supporting carrier member. The spray elements serve to rinse out the filter cake. This may be done by passing the rinsing agent agent successively at spaced time periods through individual groups of the filter elements.

3 Claims, 13 Drawing Figures

4,213,861

PRESSURE FILTER AND PROCESS FOR CLEANING IT

This is a division, of application Ser. No. 832,979, filed Sept. 13, 1977 now U.S. Pat. No. 4,163,724.

BACKGROUND OF THE INVENTION

The invention relates to a pressure filter for liquid media and in particular a pressure filter which is equipped with flexible hose-type filter elements.

In the prior art filters of this kind all individual elements are supported on one carrier bar or carrier disk. After opening the lid of the filter tank the entire package of filter elements must be removed upwards by means of a lever device if a control and cleaning is desired. The individual elements which form part of a package of elements are difficult to remove and usually removal is impossible without concurrent removal of the surrounding elements. In case of a defect of a single filter hose element it is therefore necessary to remove an entire row of filter elements. In order to lift the entire package of elements in view of the weight of the carrier member and the large number of elements, large dimension crane structures are necessary which must be placed above the filter tank. Therefore, a comparatively great height is always necessary for the structures.

Filter hose elements of this kind are known from the German published applications 2,114,226 and 1,917,306. The flexible filter elements employed there are provided with various inside support elements. Filter hose elements without supports have to be compressed inwards during the filtration. The prior art supports have resulted in an improvement of the filtration properties of this type of elements but they have also made it necessary to employ additional material and to incorporate these in the structure and thus have caused additional expense. The object of the invention is a filter which does not require elements for the support of the filters.

SUMMARY OF THE INVENTION

This object is solved by a pressure filter in which the carrier element is provided removable upon opening of the filter tank and wherein the individual filter elements are supported by this carrier element. The filter elements may be arranged in rows on a plurality of carrier elements and there may thus be removed individual groups of filter elements as desired. The filter elements themselves are provided with an exterior filter wall which may be a flexible textile and in the interior of the element packing material is provided. There may also be a spaced inner wall and the packing material may be provided between the two walls with the central space inside the inner wall adapted to receive the filtrate which is passed out through the hollow carrier member or other discharge devices.

The surprising discovery of the present invention is that special supports as shown in the mentioned German application 2,114,226 are no longer necessary.

The hollow body which is used as the collecting tube and carrier for removing individual filter segments may be freely supported on an annular disk and may be connected with the discharge tubes by a flange and a releasable connection. The collecting tube may be provided within or outside the filter tank. The individual removable hollow carrier segments can be of different length and may support varying numbers of filter elements which may be arranged in rows on a plurality of such carrier elements.

It has been found that it is highly useful to provide a baffle plate at the lower portion of the filter tank close to the entry of the liquid to be filtered in order to protect the filter elements when they are covered with filter cake against excessive turbulence of the entering slurry.

It has also been found that the filter elements preferably comprise an inner wide mesh and an outer fine mesh filter cloth. The inner cloth in this case serves as a retaining means for the packing material. The outer cloth primarily is the filter agent proper.

This structure also has the advantage that during backwash the inner cloth is not subject to stretching.

Suitable materials for both wall portions may be plastics, natural fibers or permeable metal.

In a special embodiment of the invention apertures may be provided in the area where the inner cloth is supported by a connecting tube while in the same area the outer cloth may be impermeable so that during backwash the rinsing current can rapidly enter between the two cloths and the filter cake can thus be removed uniformly from all parts of the filter elements. Thus, the rinsing medium during backwash, be it a liquid or gas, is distributed by the hollow carrier element to the individual filter elements. Groups of filter elements can thus be rinsed successively in spaced time periods. This also helps to accomplish a uniform removal of the filter cake.

The backwash can be effected with a vaporous rinsing fluid. The fluid in that case is fed as a vapor or mist into the filter tank and pressued through the filter cake.

There exist however filter cakes which are very difficult to remove and which cannot be completely removed by compressed air or a backwash with liquid. For cases of this kind it is proposed to arrange between two rows of filter elements, a row of spray tubes extending throughout the entire length of the filter elements. These spray tubes are also provided on a removable carrier element which may be connected by a flange or clutch to an inlet tube. The spray tubes may be provided with spray nozzles.

The filter elements according to the invention are filled with various kinds of packing materials. For this purpose there may be used Raschig rings, Berl saddles, and further also glass balls, stones, quartz sand, coal, coke and catalysts. Raschig rings of the same diameter as the inner diameter of the filter hose can be arranged in columns on top of each other. The arrangement must, however, be such that at the front end the liquid in the form of the filtrate can penetrate. Rings of metal or ceramic having lateral apertures are also useful as packing materials. For special application metal catalysts, fuller's earth, activated coal and other surface active materials, preferably in the form of granulates may be used. The particles of the granulates may be made stationary by a suitable adhesive, for instance a synthetic resin or sodium silicate (water glass).

It is preferred to use as packing material bodies of a specific weight below 1. Useful are, for instance, spherical fillers of bloated clay such as are used as structural and insulating materials under the tradename Leca-Korn which are made by Hunziker-Baustoffe corporation of Bern, Switzerland. This material is resistant almost against all chemicals and hard and non-abrasive. The weight by volume of the loose grains in dry condition is between 330 and 700 kg/m$^3$; the grain size is between above 0 to 20 mm diameter. It is, however, possible also to use inorganic bloated materials with an open or continuous surface and plastics in the form of hollow spheres. The individual bodies may be fixed in their relative position.

If the filters are employed for catalytic reactions it is preferred to form a central hollow space in the interior of the element which can be done for instance by inserting a type of sieve tube into the filter element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
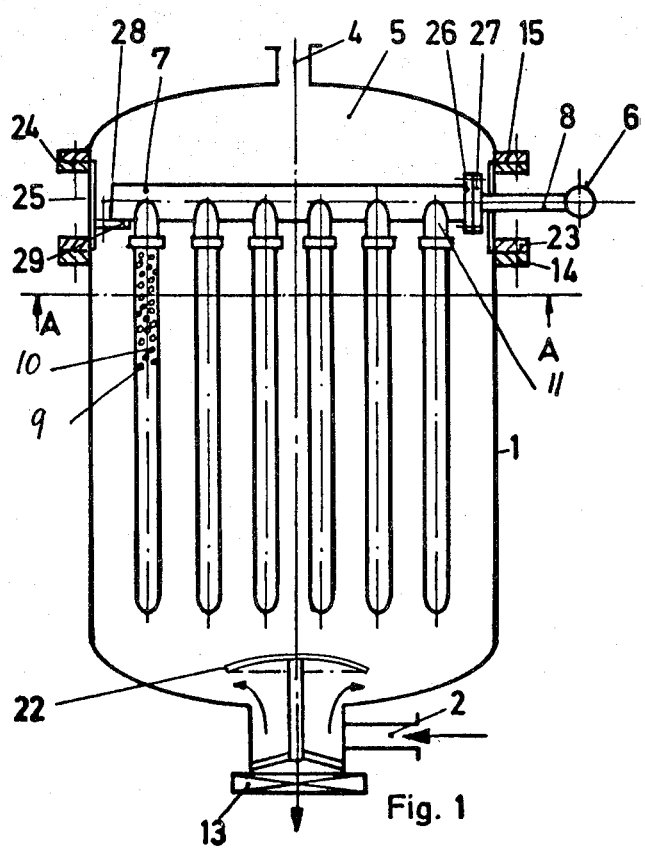
FIG. 1 is a cross section through a pressure tank filter.
Figure 2:
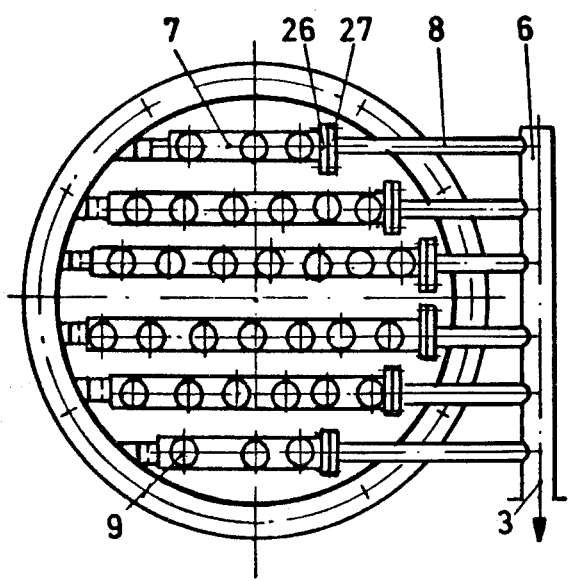
FIG. 2 is a section through the filter of FIG. 1 on lines A—A.

With reference particularly to FIGS. 1 and 2 it will be seen that 1 shows a filter tank which is provided with tube-like filter elements 9. In the lower portion of the tank 1 which, of course, may also have conical form, an inlet tube 2 and an outlet tube 13 are provided, the latter serving as the outlet for the filter residue.

The filter tank 1 and its lid 5 are connected by means of a T-shaped intermediate ring 25. The ring 25 is releasably connected to the flange 14 of the tank by means of a cooperating flange 23. One half of the annular ring 25 is provided with a support ring 29 welded to its inner wall.

In the wall of the other half of the annular ring 25 bores are provided which communicate with connecting tubes 8 which latter extend through the outer wall of the tank and lead to a collector tube 6 which is provided with a discharge opening 3. The top portion 5 is connected by means of a flange 15 to the upper flange 24 of the annular bridge portion 25.

In the left-hand filter element the section shows the upper portion of the filter element 9 with the packing material 10.

The baffle plate 22 which is provided beneath the filter element has the purpose to prevent excessive turbulence in the filter tank in order to prevent an unintended rinsing out of the filter cake which has formed on the outside of the filter elements.

Figure 3:
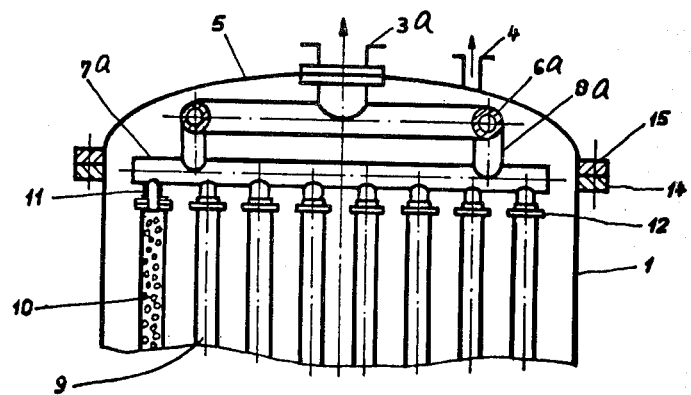
FIG. 3 is a modification of the discharge for the clear liquor in the dome of the filter tank of FIG. 1.

With reference now to FIG. 3 it will be seen that in this case the tank 1 is provided with a lid which can be locked by means of the flange 14 of the main tank portion and the flange 15 of the top portion. The top of the tank is also provided with an outlet 3a for the clear liquor and an exhaust opening 4. The collector tube 6a in this case is provided in the interior of the tank and is connected by tubes 8a to the hollow carrier member 7a for the filter elements. The filter elements 9 are attached to the hollow carrier member 7a and thereby to the collecting tube 6a by means of connecting tubes 11 which are attached to the filter elements by means of flanges or other fastening elements 12.

Figure 4:
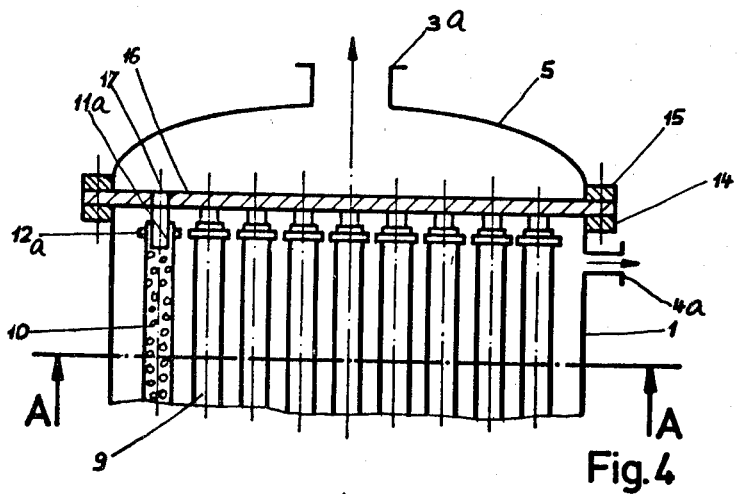
FIG. 4 is another embodiment of the discharge portion for the filtrate in the dome of the filter tank.

FIG. 4 shows another embodiment of the upper portion of the filter tank. It will be understood that the lower portion of the tank is identical with that shown in FIG. 1. The carrier member in this case is formed by a disk 16 which is fastened between the flange 14 of the main tank portion and the flange 15 of the lid portion. The disk-like carrier member in this case forms a separating wall between the lower portion of the tank in which the liquor to be filtered is received, and the upper portion which is the receptacle for the clear liquor. For this purpose the separator and collector disk 16 is provided with bores 17 of which each corresponds with one of the filter elements 9. The filter elements communicate with the hollow carrier disk by means of the connecting tube 11a which is fastened to the filter elements by a fastening ring 12a in a similar manner as in FIG. 3.

Figure 5:
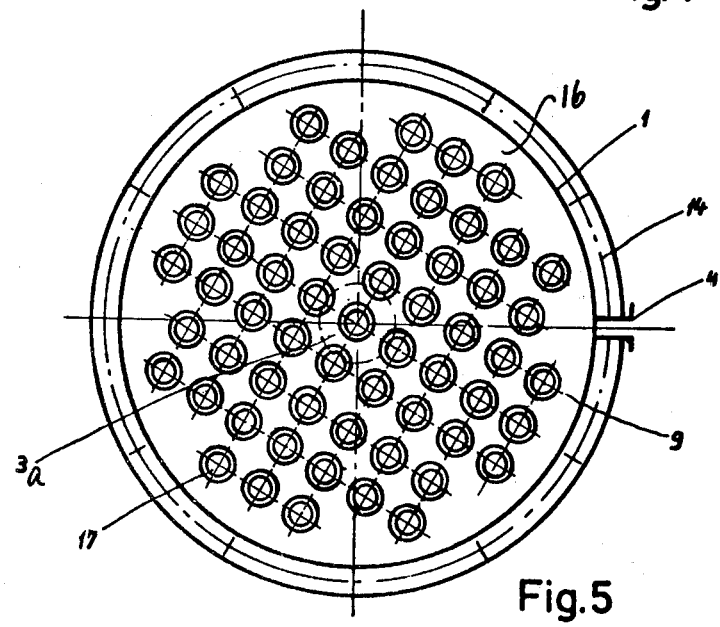
FIG. 5 is a cross section through the embodiment of FIG. 4 along lines A—A.

An air inlet and outlet is provided in this case in the lower portion of the tank that is below the separating and collecting disk 16 (part 4a). The bores 17 of the carrier disk which connect with the filter elements 9 and the outlet for the filtrate 3a which connects with the collecting tube 6a are more clearly shown in the section of FIG. 5.

Figure 6:
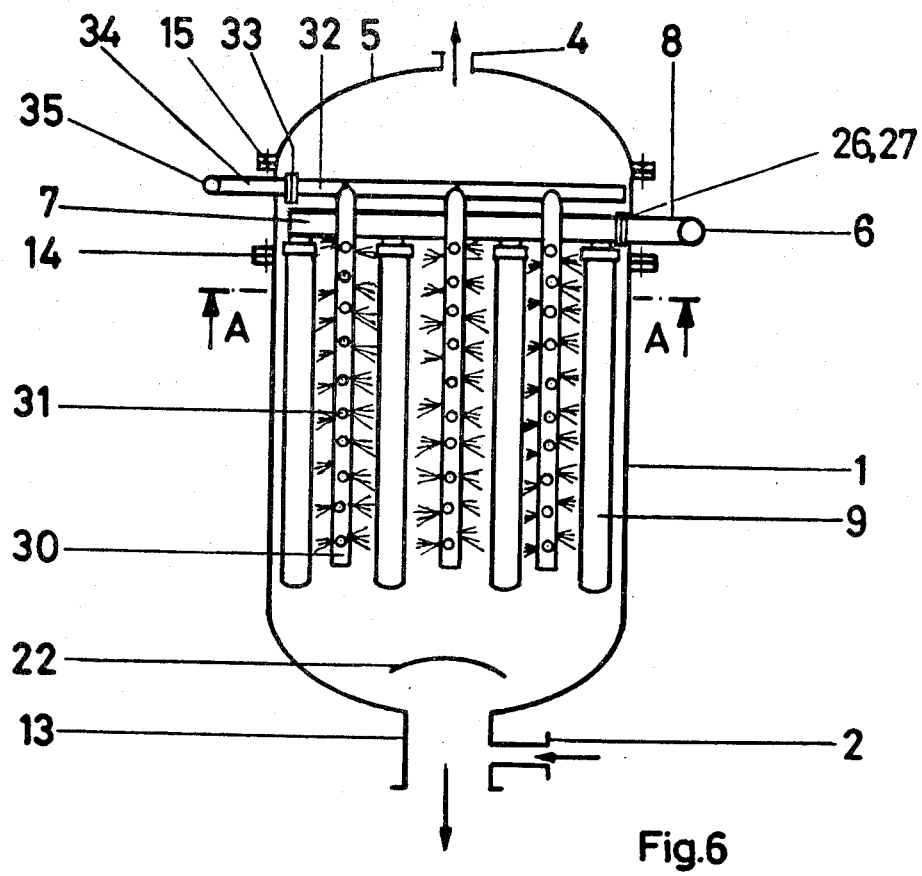
FIG. 6 is a cross section through a filter tank which is provided with a spray tube device for rinsing purposes.
Figure 7:
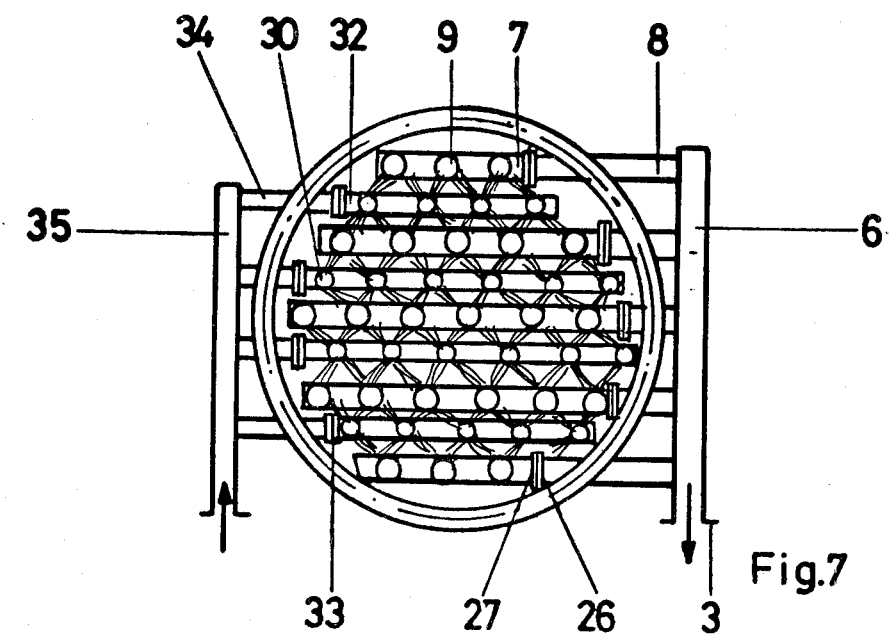
FIG. 7 is a cross section through FIG. 6 along lines A—A.

The embodiment shown in a longitudinal section in FIG. 6 and in cross section in FIG. 7 shows a filter tank which is provided with spray tubes 30 which may be made of metal or a plastic. The tubes 30 are provided with a multitude of spray bores 31 in which nozzles may be provided.

As is shown particularly in FIG. 6, one row of such spray tubes 30 is disposed in the space between two rows each of filter elements 9. The spray tubes are in communication with a distributer pipe 32 which is provided with an inlet 35. The distributer tube is disposed above the hollow carrier member 7. After opening the top portion 5 of the tank and releasing the flange 32 each distributer tube 32 with the connected spray tubes 30 can be separately removed. Between the distributer tube 32 and the inlet opening 35 there is provided a connecting tube 34.

The filter elements themselves are shown in different embodiments in FIGS. 8 to 13.

Figures 8, 9, 10:
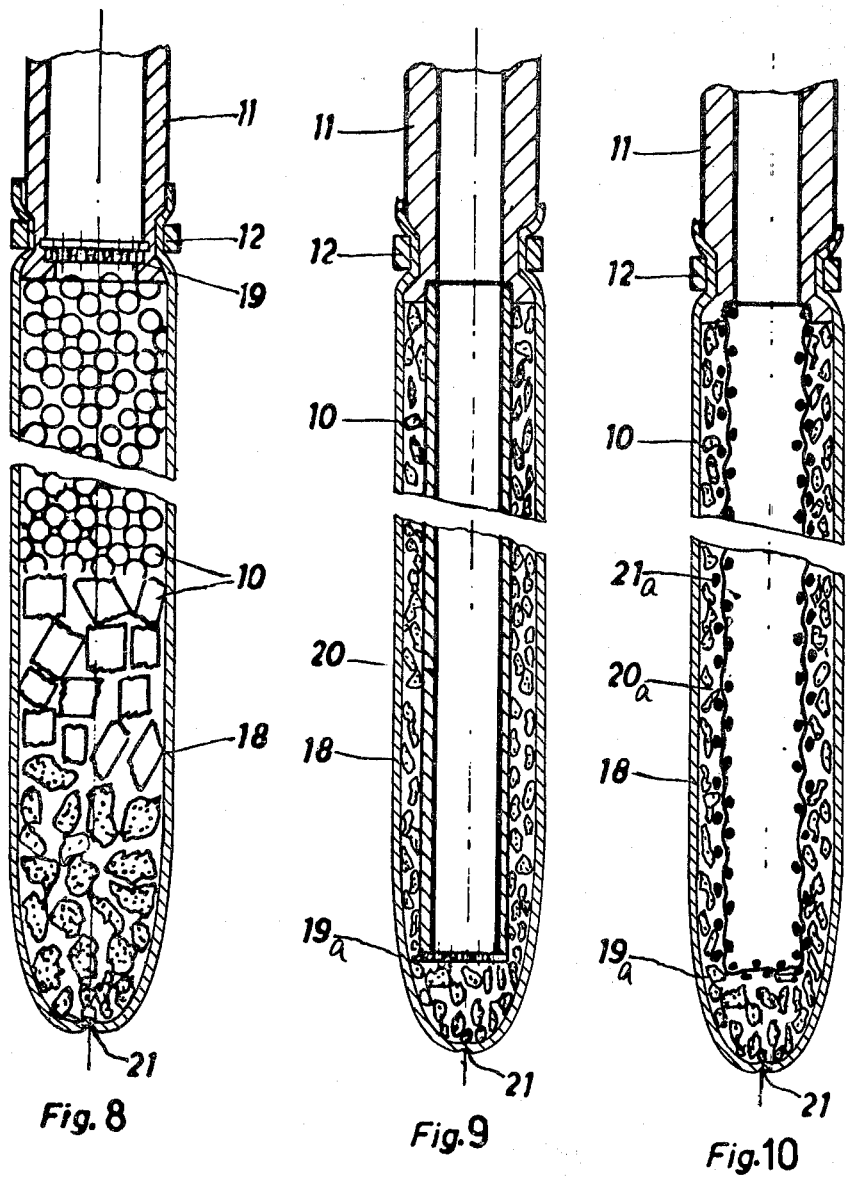
FIG. 8 is a longitudinal section through a filter element.
FIGS. 9 to 13 are similar cross sections through other embodiments of filter elements.

FIG. 8 illustrates a comparatively simple form of filter element which is provided with a filtering agent in form of a wall 18 which may consist of a plastic cloth such as "Teflon", nylon, "Perlon" or natural fibers or also fine meshed metal cloth. The width of the apertures of the cloth depends on the size of the solid particles which are to be removed by the filtration. The interior of the tube-like filter element 9 is filled with the packing material 10. A screen plate 19 forms a barrier to prevent penetration of the packing matter into the filtrate space of the tank by way of the connecting tube 11.

The filter cloth which forms the outer wall is provided with a seam 21 to hold together its two sections and is attached at its upper end by means of a fastening link 12 to the connecting tube 11.

FIG. 9 shows another embodiment where the outer wall is again the filtering agent 18 while there is provided an inner wall by way of a solid tube 20. The spring plate 19a in this case is disposed at the lower opening of the tube 20. The packing material 10 is disposed in the space between the tube 20 and the filtering wall 18.

FIG. 10 shows a similar embodiment where, however, the inner tube is formed by a perforated flexible wall 20a. The packing material is disposed in the intermediate space 21a between the inner wall 20a and the outer filtering wall 18. The packing material, for instance may be a catalyst granulate.

Figure 11:
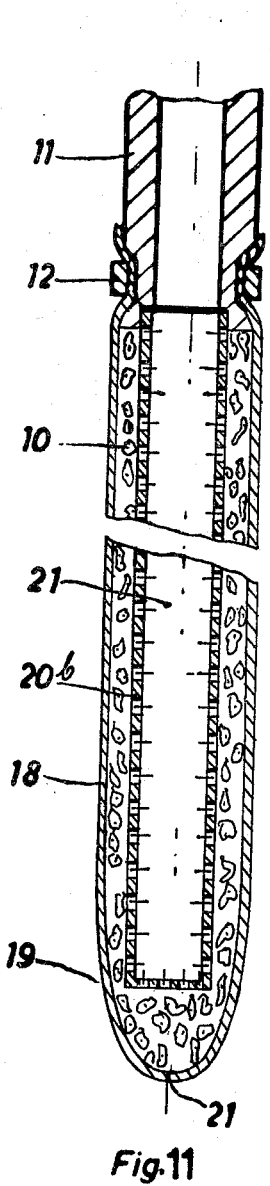

FIG. 11 is a similar embodiment in which, however, the inner wall is formed by an apertured tube 20b which at its lower end is closed by a screen plate 19.

Figure 12:
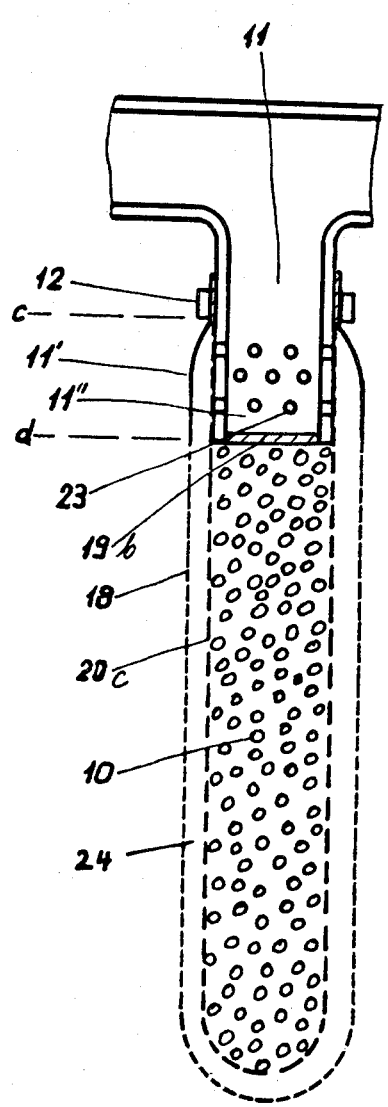
Figure 13:
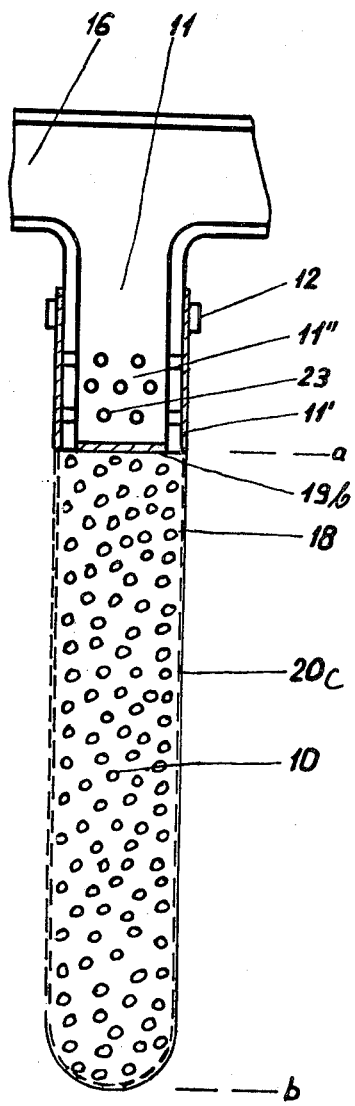

FIGS. 12 and 13 show more distinctly the connection between the filter walls proper and the connecting tube 11 which leads to the hollow carrier member 7. The connection as appears is again held by a fastening ring 12. In FIG. 12, however, as distinguished from FIG. 11 the packing material is provided in the innermost space inside the inner wall 20c and the outer wall formed by the main filtering agent 18. Both the outer and the inner wall consist of cloth type filter elements, the outer wall, however, having a finer mesh size than the inner wall. In this case the screen plate 19b is provided at the open end, (FIG. 12) of the inner wall portion or (FIG. 13) at the open end portion of both wall members. Thus, the penetration of the packing material into the connecting tube 11 is prevented. The filter walls are again connected to the connecting tube 11 by means of a fastening ring 12.

The connecting tube is provided with openings 23 and the inner wall member in FIG. 12 and the inner wall member 20c in FIG. 12 has corresponding openings. The same type of openings is used in the embodiment of FIG. 13 where, however, the outer wall member and the inner wall member are immediately contiguous. The length 11' of the outer wall member which laps the lower portion 11" of the connecting tube 11 may be varied and can be up to one-fourth of the length of the connecting tube. It may be made of a rigid or a flexible impermeable material. The inner filter wall in FIG. 13 extends in contact with the extension 11' of the connecting tube 11. In this area the openings 23 are provided both in the connecting tube and in the inner filter wall 20c.

The operation of the filter tank of the invention is as follows. With reference again to FIG. 1 it will be seen that the liquor or slurry to be filtered enters through the inlet 2. Filter aids may be provided in the liquor. By means of the pressure applied the liquid to be filtered is caused to penetrate the filter wall 18 of the filter elements 9. The solid particles to be eliminated will be deposited at the outside of the filter wall 18 and are retained there by means of the pressure excess prevailing against the interior of the filter element 9.

A squeezing together of the filter tubing 9 is prevented by the presence of the packing material 10. On the other hand a squeezing outwards of the filter material into the space receiving the clear filtrate in the connecting tube 11 is prevented by the screen plate 19. The clear filtrate is received in the hollow carrier member 7 and from there flows through the connecting tube 8 into the annular collector tube 6. As indicated in FIG. 3 the collector tube 6a and connecting pipe 8a may also be provided inside the filter tank. In this case the clear filtrate is discharged through an outlet tube 3a.

As indicated in FIG. 4 the filtrate may also be passed out from the hollow carrier member, which in this case is in the form of an apertured disk 16, directly into the dome space of the tank and through the outlet 3a.

Upon completion of the filtration cycle the filter cake can be removed in a wet or dry process. A wet removal is possible by back washing with a rinsing liquid which may consist of water, a suitable solvent or even clear filtrate. It is thus possible in a short time to remove the filtrate and at the same time to accomplish a cleansing of the filter element.

It is, however, also possible to employ gas in countercurrent to the direction of filtration in order to remove the filter cake. The drying of the filter cake can be effected by a gas or steam current in the direction of the filtration.

The loosening of the filter cake can also be effected by vibration or by impulses of compressed air.

For the drying step a filter element as seen in FIG. 9 is useful. The removal of the slurry as well as of the dry filter residues in all cases is effected through the opening 13 shown in FIG. 1.

In order to remove residues which have a strong adhesion it is advisable to use a rinsing liquid which can be introduced as shown in FIGS. 6 and 7 by means of a pump (not shown) and the inlet 35, connecting tube 34 and main distributing tube 32. The rinsing liquid is thus passed into the individual spray tubes 30. The rinsing liquid under pressure is then sprayed through the bores or nozzles 31 onto the outer surface of the filter tube 9. In this manner even very sticky filter residues can be removed completely.

In order to lift an entire row of filter elements, for instance for control purposes or regeneration purposes, the fastening by means of the flanges 15 and 24 in FIGS. 1 and 2 is released. This permits to lift the lid 5 and a desired row of filter elements 9 can then be removed merely by releasing the flange 26 at the hollow carrier member 7 and the flange 27 at the connecting tube 8. An entire row of filter elements can then be pulled out and checked or exchanged. Instead of the flanges 26, 27 it is also possible to use clutch-connections. In order to check each specific filter segment inspection glasses or specimen valves may be provided in the connecting tubes outside the filter tank proper. The packing material for the filter elements may be either a homogenous or heterogenous material. It may consist of different materials of widely varied shapes.

The main use of the filter tanks and process of the invention is the filtration of liquids. A particular advantage of the filter elements of the invention is their connection to the filter tank which permits the movably disposed filter tube-like filter element to be removed and also permits an easy removal of the filter cake.

The backwashing of the tank for removal of the filter cake can be effected with relatively small amounts of solvents by spraying the solvents into the tank or by a finely distributed condensate whereby the soluble components can be dissolved out of the filter cake. In case of expensive solvents this is frequently of great economic importance.

A special use of the invention are catalytic reactions and decoloring processes for solutions.

Enzymes fixed on a carrier material, that is biocatalysts may also be used as packing material. By an approximately even thickness of the catalyst layer and of the fixed enzymes, equal reaction times and thus equal conversion products may be obtained.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process of cleaning a filter comprised of elongated filter tank and a plurality of filter elements in the filter tank and spaced from each other in a direction substantially transverse to the elongation of the filter tank, comprising the steps of arranging said filter elements in a plurality of rows located one after the other and parallel to each other; positioning a plurality of further rows of flush-medium supplying tubes, also located one after the other and parallel to said first-mentioned rows of said filter elements, so that each of said supplying tubes are located between two adjacent filter elements, each of said tubes having a plurality of uniformly distributed openings provided with nozzles each of which is open toward the adjacent filter elements; communicating said supplying tubes with a common distributing conduit; and supplying a flushing medium from said distributing conduit into said supplying tubes, so that the flushing medium exits the nozzles and is sprayed onto said filter elements under positive pressure, whereby a filter cake accumulated on said filter elements during the filtering process is removed by the thus-sprayed under pressure flushing medium.

2. An arrangement for cleaning a filter, comprising in combination, an elongated filter tank; a plurality of filter elements in said filter tank and spaced from each other in a direction substantially transverse to the direction of elongation of said tank, said filter elements being arranged in a plurality of rows each located one after the other and parallel to each other; a plurality of further rows of flush-medium supplying tubes, located one after the other and parallel to said first-mentioned rows of said filter elements, so that each supplying tube is located between two adjacent filter elements, each of said supplying tubes having a plurality of uniformly distributed openings provided with nozzles each of which is open toward the adjacent filter elements; a common distributing conduit communicating a source of the flushing medium with said tubes; and means for imparting pressure to the flushing medium, so that the latter is supplied from said distributing conduit into said supplying tubes, exits said nozzles, and is sprayed under positive pressure onto said filter elements to thereby remove a filter cake accumulated on said filter elements during the filtering process.

3. An arrangement as defined in claim 2, wherein said first-mentioned rows of said filter element, said further rows of said supplying tubes, and said distributing conduit are removable.

* * * * *